United States Patent [19]
Goldschmidt et al.

[11] Patent Number: 5,627,585
[45] Date of Patent: May 6, 1997

[54] ARRANGEMENT FOR HIGH-RESOLUTION SCANNING OF LARGE IMAGE FORMATS WITH EXACT GEOMETRICAL CORRESPONDENCE

[75] Inventors: Ralf Goldschmidt; Werner Borchardt, both of Jena, Germany

[73] Assignee: Rheinmetall Jenoptik Optical Metrology GmbH, Germany

[21] Appl. No.: 684,320

[22] Filed: Jul. 19, 1996

Related U.S. Application Data

[63] Continuation of Ser. No. 393,247, Feb. 23, 1995, abandoned, which is a continuation of Ser. No. 57,258, May 4, 1993, abandoned.

[30] Foreign Application Priority Data

May 6, 1992 [DE] Germany ............... 42 14 926.6

[51] Int. Cl.⁶ ............... H04N 7/18; H04N 1/387
[52] U.S. Cl. ............... 348/142; 348/61; 348/94; 348/135; 358/479; 358/452; 358/453; 356/375
[58] Field of Search ............... 382/284, 268, 382/324; 356/375, 376, 383; 348/135; 358/452, 453, 479; H04N 7/18, 1/387

[56] References Cited

U.S. PATENT DOCUMENTS

| | | | |
|---|---|---|---|
| 4,315,282 | 2/1982 | Schumacher | 348/141 |
| 4,485,409 | 11/1984 | Schumacher | 358/479 |
| 4,532,544 | 7/1985 | Federau | 348/37 |
| 4,858,020 | 8/1989 | Homma | 358/287 |
| 4,928,169 | 5/1990 | Leberl et al. | 348/61 |
| 5,018,023 | 5/1991 | Kubota | 358/450 |
| 5,050,001 | 9/1991 | Hatanaka et al. | 358/302 |

FOREIGN PATENT DOCUMENTS

| | | |
|---|---|---|
| 0105661 | 4/1984 | European Pat. Off. . |
| 0177372 | 9/1986 | European Pat. Off. ....... H04N 1/387 |
| 0366456 | 5/1990 | European Pat. Off. ......... H04N 3/15 |
| 4200961A1 | 5/1993 | Germany ........................ H04N 1/04 |
| WO83/03516 | 10/1983 | WIPO . |
| WO88/07312 | 9/1988 | WIPO .............. H04N 7/18 |
| WO90/05424 | 5/1990 | WIPO .............. H04N 1/46 |

OTHER PUBLICATIONS

Raynor et al. –The Technology and Practical Problems of Pixel–Synchronous CCD Data Acquisition for Optical Metrology Applications—Sep. 1990—SPIE vol. 1395—pp. 96–103.

*Primary Examiner*—Wendy Garber
*Assistant Examiner*—Andrew B. Christensen
*Attorney, Agent, or Firm*—McAulay Fisher Nissen Goldberg & Kiel, LLP

[57] ABSTRACT

An arrangement for high-resolution scanning of large image formats with exact geometrical correspondence is described. It is applied in photogrammetry and in optoelectronic scanners with high requirements regarding exact geometrical correspondence. Metric image contractions of large image formats are obtained without dimension-embodying auxiliary means by employing a CCD matrix which is exactly dimensioned to pixel sensitivity distribution. This CCD matrix is used as an absolute dimensional embodiment, from which only one active pixel area determined as a function of the memory area of the frame grabber is adopted into the frame grabber while ensuring an image contraction which is absolutely synchronous with the pixels. Based on the pixel raster, this active pixel area forms the step width for the high-precision scanning mechanism which is adapted with respect to its accuracy, wherein the active pixel areas of the scanning steps are lined up so as to cover the surface without gaps and substantially without overlaps. Dimension-embodying auxiliary means, e.g. network grids, can accordingly be dispensed with without any impairment of accuracy.

5 Claims, 1 Drawing Sheet

ARRANGEMENT FOR HIGH-RESOLUTION SCANNING OF LARGE IMAGE FORMATS WITH EXACT GEOMETRICAL CORRESPONDENCE

This is a continuation of application Ser. No. 08/393,247, filed Feb. 23, 1995, now abandoned, which is a continuation of application Ser. No. 08/057,258, filed May 4, 1993, now abandoned.

BACKGROUND OF THE INVENTION a) Field of the Invention

The invention concerns an arrangement for high-resolution scanning of large image formats. It is used in applications necessitating metric image contractions of image patterns which are many times larger than common CCD matrices, e.g. in two-dimensional and three-dimensional coordinate measurement techniques (photogrammetry) and in optoelectronic scanners with high requirements with respect to exact geometrical correspondence.

b) Background Art

In the acquisition of large image formats by means of CCD matrix receivers, it is known to use auxiliary means to ensure a geometrically exact and dimensionally correct image contraction. Such known auxiliary means are image dividers based on optical fibers, which require additional expenditure on matrix receivers, and the projection of grid structures into the object or image plane of the measured object or image model, wherein the reproduction of the image model, to which a grid is applied, is moved relative to a scanning matrix receiver.

The latter method in particular has led to geometrical resolution of the image recording of large-format models due to the simple tying of a dimensional embodiment to the image model.

For example, EP-PS 237 601 describes a method for photogrammetric acquisition of an object by means of an optoelectronic solid-state surface sensor which uses a network grid for exactly determining the position of the parts of the image of a large-format model in such a way that at least one network mesh is accommodated in every sensor image. Accordingly, when the approximate position of the sensor is sufficiently known, the number of network meshes is determined and every image dot can be related to a reference value of the network system.

DE-PS 34 28 325 discloses an arrangement of optoelectronic solid-state surface sensors in a photogrammetric imaging system for achieving a geometrically exact assignment of the position of sensors whose image surface is smaller than the total or overall format. In so doing, the dot field of a network is incorporated into the imaging process in such a way that at least one mesh of the network is accommodated by a sensor surface, wherein the network is either moved along on the model or is applied in the image plane scanned by the sensor.

In DE-PS 38 11 837, which similarly relates to a dot field produced by a network covering the entire image, the surface sensor being situated behind the network plane, the network points (or dots) are projected with punctiform illumination and a focussing of the surface sensor with constant allocation of the recording projection center relative to the network occurs.

The disadvantage in the described solutions consists in that dimension-embodying auxiliary means which impair scanning or increase cost are always required for exact metric scanning.

OBJECT AND SUMMARY OF THE INVENTION

The present invention has, as a primary object, providing a metric, high-resolution image read-in of large image formats on the basis of CCD matrix scanning without dimension-embodying auxiliary means.

This object is met in an arrangement for high-resolution scanning of large image formats with exact geometrical correspondence having at least one CCD matrix whose magnitude constitutes only a fraction of the image model to be scanned, a frame grabber, and a movement mechanism, in that the CCD matrix is exactly dimensioned to pixel sensitivity distribution and, with the resulting actual pixel center distances, the matrix itself represents an absolute dimensional embodiment in the form of the pixel raster. The CCD matrix includes an active pixel area adapted to the maximum memory area of the frame grabber and is fixed with respect to the number and position of pixels, wherein the constancy of the unequivocal allocation of the pixel area to the memory area is based on pixel synchronization of the image read-in. The movement mechanism is a high-precision scanning mechanism whose accuracy is adapted in accordance with the measured pixel raster and by means of which the active pixel area of the CCD matrix can be displaced in the image format to be scanned so as to cover the surface without gaps and substantially without overlaps.

In order to reduce the scanning time, the image format is advantageously divided into congruent parts which are scanned simultaneously by a corresponding number of CCD matrices of the high-precision scanning mechanism in the same pattern synchronously or with a time delay. It is advisable, particularly in the case of rectangular image formats, to divide into two halves, which results in a halving of the maximum scanning distance. It is advantageous that CCD matrices of the same manufacturing batch be used for dividing the image format and for synchronous scanning. The high-precision scanning mechanism is advisably manufactured from materials having a low thermal expansion coefficient in order to prevent overlapping of the active pixel areas during successive scanning steps of the CCD matrix. In order to compensate for residual effects, the high-precision mechanism is adjusted so as to ensure the lining up of the active pixel area without gaps for every scanning step for the highest acceptable ambient temperature, wherein the slight overlapping at lower temperatures is eliminated electronically by suitable memory allocation.

The fundamental idea of the invention is that auxiliary means for metric dimensional embodiment can be dispensed with precisely because the CCD matrix itself is so exactly measured and governable by means of signal processing techniques that it can be used reliably as an absolute dimensional embodiment. To this end, an absolute pixel synchronization must be ensured according to the invention in addition to the exact measurement of the pixel sensitivity distributions and the determination of the pixel center distances. That is, a local light intensity distribution may not change its position in the frame grabber memory while being electronically adapted into the frame grabber within different image read-ins with constant ratios, and when there is a defined displacement of the light intensity distribution by a defined number of pixel center distances caused by the movement of the CCD matrix by the high-precision scanning mechanism, this movement must be reflected (with exact geometrical correspondence) in a displacement by the corresponding number of memory locations in the frame grabber. When a sufficiently exact positioning of the high-precision scanning mechanism is possible in addition, it is possible to effect metrically exact image scanning solely by means of the CCD matrix as a dimensional embodiment.

With the arrangement according to the invention, it is possible to achieve a high-resolution scanning of large image formats with exact geometrical correspondence using a CCD matrix without dimension-embodying auxiliary means.

For a better understanding of the present invention, reference is made to the following description and accompanying drawings while the scope of the invention will be pointed out in the appended claims.

DESCRIPTION OF THE PREFERRED EMBODIMENTS

The arrangement according to the invention in its basic construction includes a CCD matrix 1 for scanning the image format 4 which is a number of times larger than the CCD matrix, a frame grabber 3, and a high-precision scanning mechanism.

Figure 1:
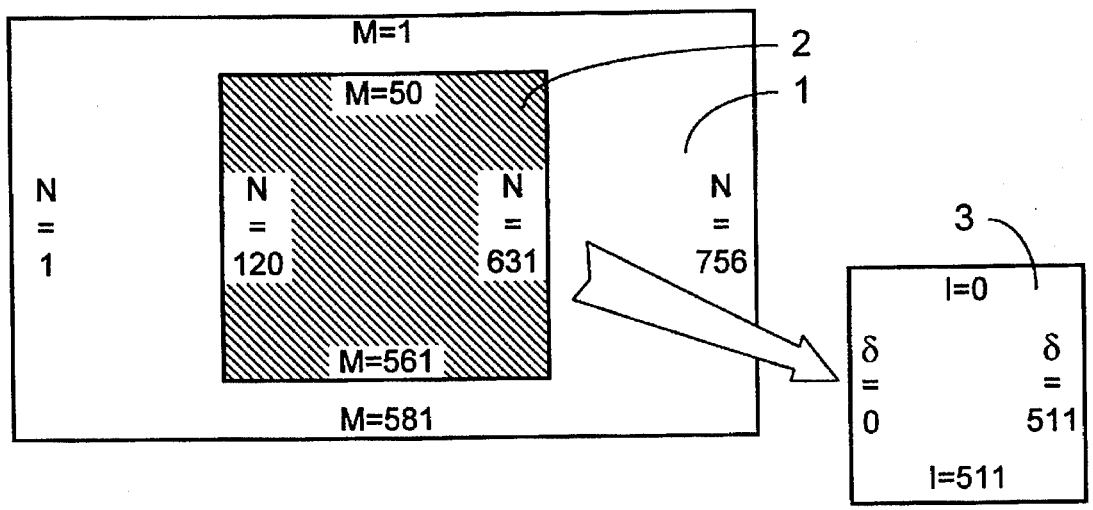
FIG. 1 shows the position and number of the active pixel area of the CCD matrix and the adequate allocation of the memory locations of the frame grabber.

FIG. 1 shows the CCD matrix 1 as a matrix with M rows and N columns. In the example, the CCD matrix has 756×581 pixels. The frame grabber 3 must have a memory of 512×512 memory locations available for a CCD readout. The volume of the matrix pixels which can be read out is determined by the magnitude of the memory of the frame grabber 3. The resulting active pixel area 2 of the CCD matrix 1 can be selected optionally in principle, but must be constant and should lie on the CCD matrix 1 as indicated in the example in FIG. 1.

Along with the exact measurement of the pixel sensitivity distribution and accordingly that of the pixel center distance embodying the pixel raster, the constancy of the active pixel area constitutes the essential point for the use of the CCD matrix 1 itself as a dimensional embodiment. This constancy is achieved by the pixel-synchronous operation of the memory area I×J of the frame grabber 3 and active pixel area 2, i.e. the same pixels must always be stored in the same memory location for all readouts of the CCD matrix 1.

Figure 2:
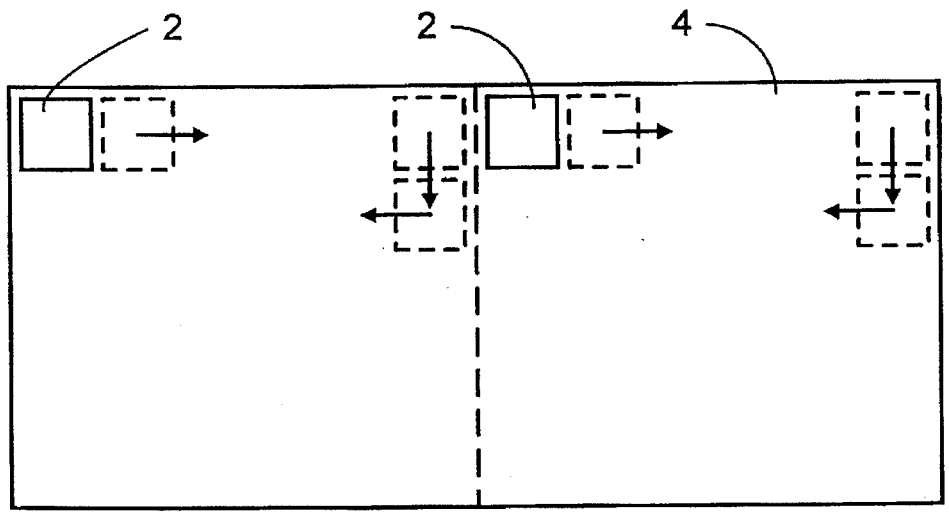
FIG. 2 shows the arrangement according to the invention with the image format divided in two.

A large image format 4, which can be rectangular as indicated in FIG. 2, is scanned, e.g., by two matrices 1 which execute the same—e.g. meandering—scanning pattern in each half of the image with their active pixel areas 2 indicated in FIG. 2. In so doing, they are guided by the high-precision scanning mechanism in a uniform manner and on the basis of the measured pixel raster without gaps and substantially without overlaps. For this reason, it is advantageous that the matrices 1 originate from one and the same manufacturer's batch so as to have the most uniform possible characteristics.

The scanning step sizes and the spacing of the two matrices which are necessary for scanning with exact geometrical correspondence without gaps or overlaps follow from knowledge of the position and number of the matrix pixels adopted in the frame grabber 3 (see FIG. 1) and from the size of the image format 4. That is, horizontally only pixels 120 to 631 of each matrix 1 and vertically only pixels 50 to 561 of each matrix 1 participate in the image read-in as shown in FIG. 1. This results compulsorily in the scanning steps indicated in FIG. 2. To compensate for unwanted overlaps due to temperature fluctuations, the lining up or stringing together of the active pixel area 2 in successive scanning steps completely without gaps is adjusted for the highest acceptable ambient temperature. The overlaps occurring at lower temperatures can accordingly be eliminated electronically by corresponding memory allocations based on calibrations.

Figure 3:
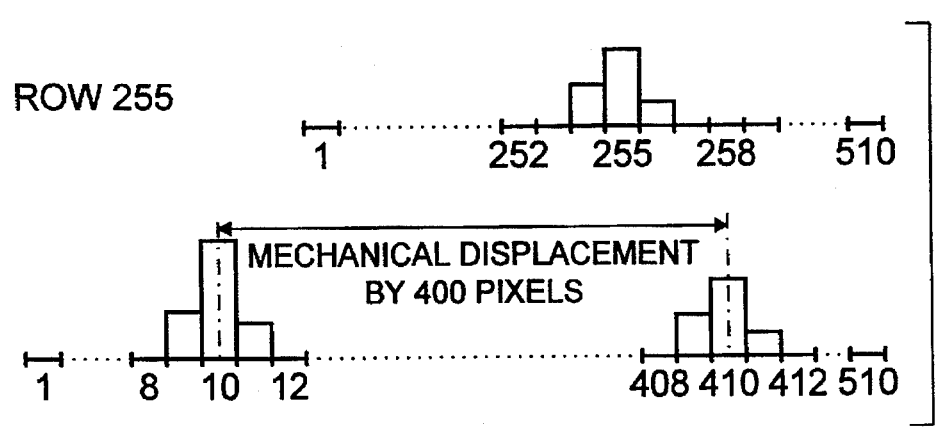
FIG. 3 is a schematic illustration of the conditions for fulfilling the pixel synchronization to be adjusted according to the invention.

FIG. 3 is now referred to for the purpose of explaining the final and most important prerequisite for metric storage of image contents with exact geometrical correspondence. Row 255 has been selected. In the first part of FIG. 3, the criterion for the stationary imaging of a local light intensity distribution (e.g. of a light spot smaller than the magnitude of a matrix pixel) is shown as the result of averaging more than 200 image indentations. The second part of the figure illustrates the criterion of the exact geometrical correspondence of the matrix in a defined displacement of the spot imaging by a determined number of experimentally determined pixel center distances (in this case 400 pixels). In so doing, it must be ensured that the maximum of the spot imaging is stored exactly by the corresponding number of memory locations in the frame grabber 3. When both criteria are met, as shown in FIG. 3, the requirement of pixel synchronization is fulfilled and a metric image indentation of the image format 4 with exact geometrical correspondence can be achieved with the sequence of active pixel areas 2 without gaps.

While the foregoing description and drawings represent the preferred embodiments of the present invention, it will be obvious to those skilled in the art that various changes and modifications may be made therein without departing from the true spirit and scope of the present invention.

What is claimed is:

1. In an arrangement for high-resolution scanning of large image formats for providing scanned images of said large-image formats with substantially exact geometrical correspondence, said arrangement having at least one CCD matrix whose magnitude constitutes only a fraction of the image model to be scanned, a frame grabber, and a movement mechanism, the improvement comprising:

means for provision of an accurate measure of length and width dimensions of the CCD matrix, wherein the measurement is performed, prior to high-resolution scanning of a large image format, by evaluating local light response distributions of all the pixels to determine actual distances between pixels of the CCD matrix, said matrix itself representing an absolute dimensional embodiment in the form of a premeasured pixel raster;

said CCD matrix including an active pixel area corresponding to maximum memory area of said frame grabber and being fixed with respect to the number and position of pixels;

means, based on pixel synchronization of image read-in to the frame grabber for assuring constancy of a one-to-one correspondence allocation of the pixel area to the memory; and said movement mechanism being a high-precision scanning means whose operation is in accordance with and determined by the premeasured pixel raster, said mechanism for scanning the active pixel area of the CCD matrix in the image format to be scanned so as to cover the surface without gaps and substantially without overlaps, said scanning being effected without the use of any auxiliary means.

2. The arrangement according to claim 1, wherein the image format is divided into congruent parts and a number of CCD matrices corresponding to the number of image format parts are arranged at the high-precision scanning means so that the image format parts are scanned by the respective associated CCD matrix in the same pattern.

3. The arrangement according to claim 2, wherein the image format is divided into two halves in order to halve the extent of the maximum scanning distances.

4. The arrangement according to claim 2, wherein CCD matrices of the same manufactured batch are used.

5. The arrangement according to claim 1, wherein the high-precision scanning means has only a slight dependence on temperature as a result of a suitable selection of materials, and the lining tip of the active pixel area without gaps for every scanning step is adjusted for the highest acceptable ambient temperature, said arrangement including means for elimination of slight overlapping of the active pixel areas at lower temperatures electronically by allocating information to predetermined memory areas.

* * * * *